N. T. NICHOLS.
SOIL MULCHER AND SUBPACKER.
APPLICATION FILED JAN. 29, 1912.
1,195,710.
Patented Aug. 22, 1916.
3 SHEETS—SHEET 1.
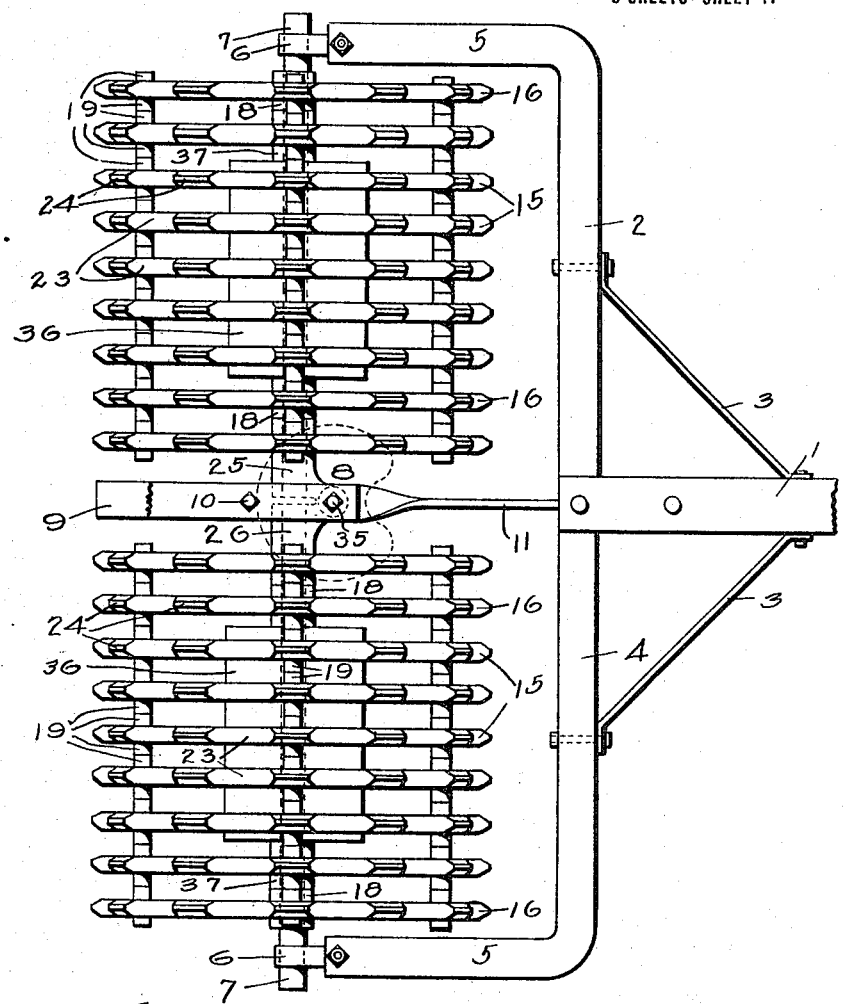
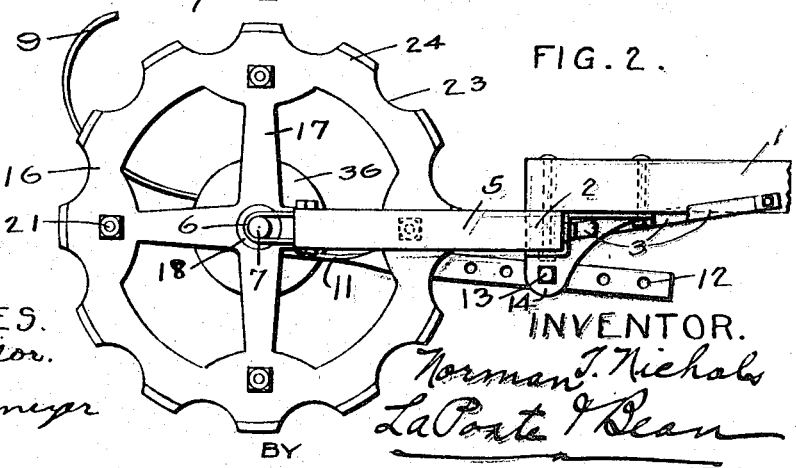

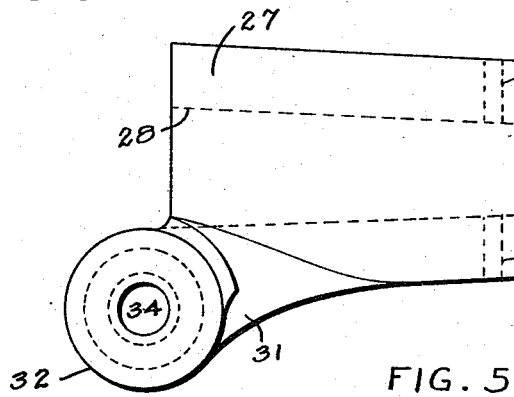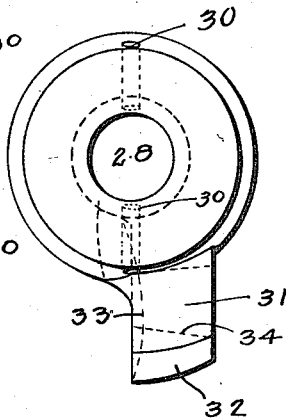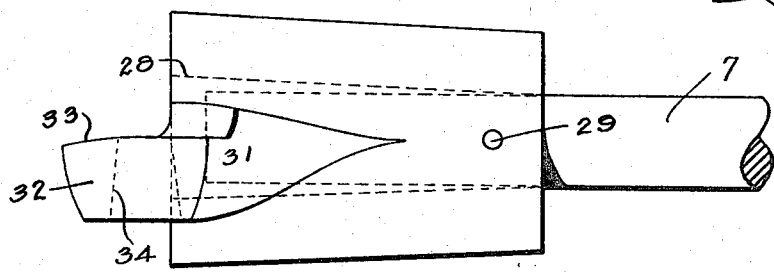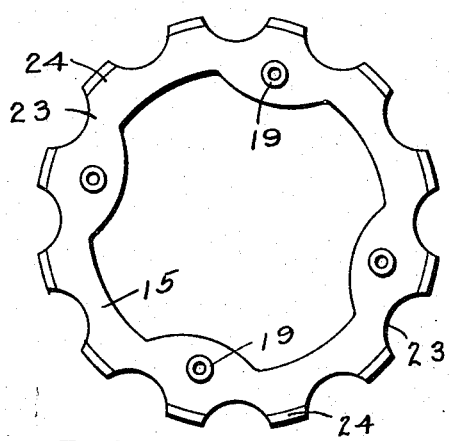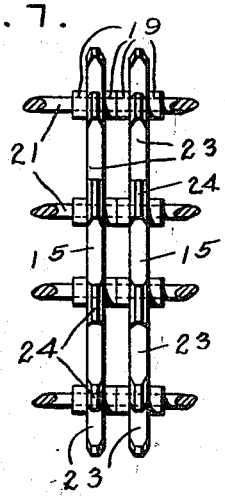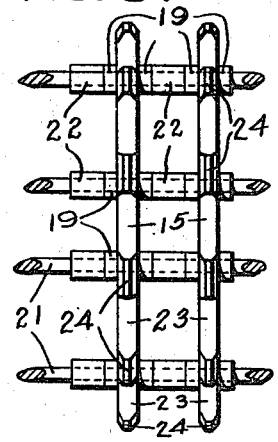

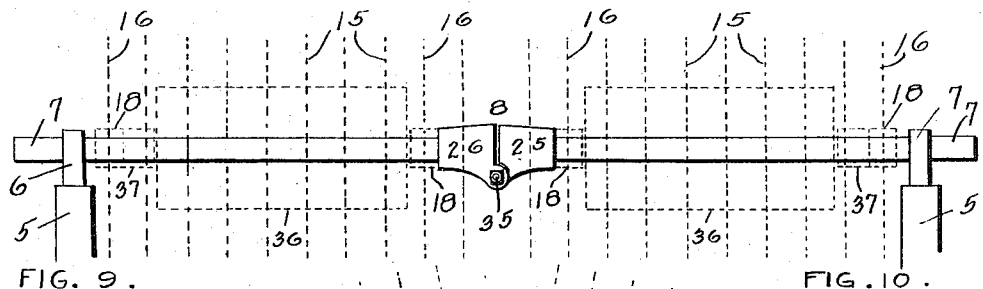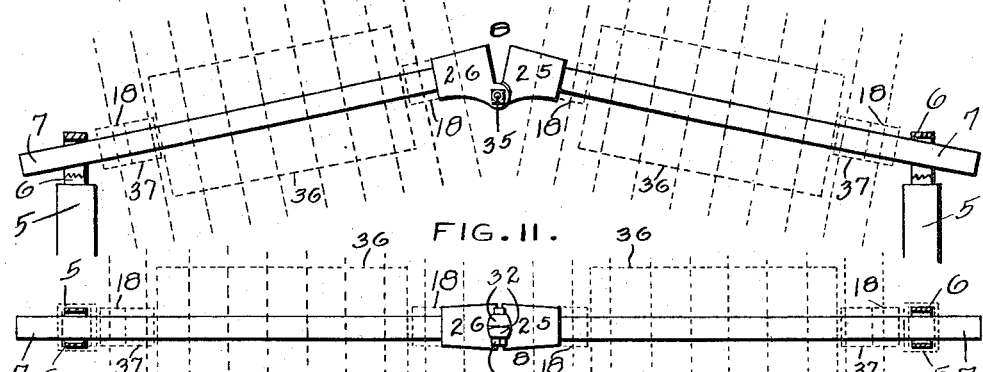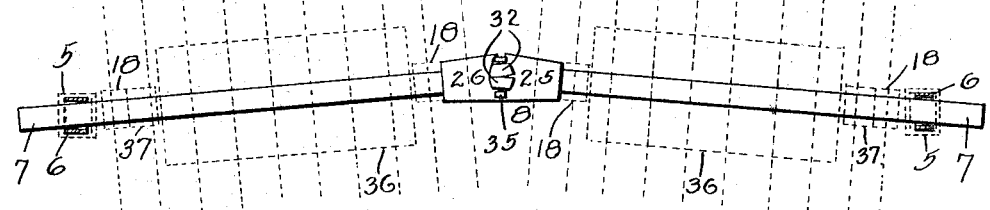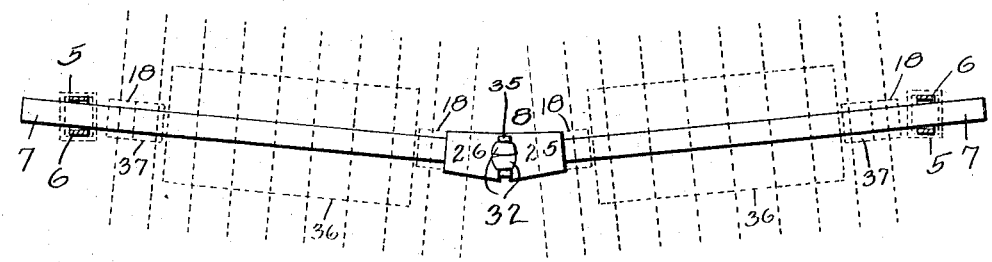

UNITED STATES PATENT OFFICE.

NORMAN T. NICHOLS, OF DELAVAN, ILLINOIS.

SOIL MULSHER AND SUBPACKER.

1,195,710.  Specification of Letters Patent.  Patented Aug. 22, 1916.

Application filed January 29, 1912. Serial No. 674,101.

*To all whom it may concern:*

Be it known that I, NORMAN T. NICHOLS, citizen of the United States, residing at Delavan, in the county of Tazewell and State of Illinois, have invented certain new and useful Improvements in Soil Mulshers and Subpackers, of which the following is a specification.

My invention relates to improvements in soil mulsher and sub-packer and this particular invention is designed to produce a simple and effective device for the crushing, pulverizing, leveling and packing of the soil and sub-soil, so as to produce a loose mulsh of soil on the ground.

An object of my invention is to provide in a device of this character a plurality of rolling and crushing members each mounted on a shaft, the shafts being mounted in a frame, and connected so as to allow the rolling and crushing members to move and be adjusted angularly relative to each other in either a vertical or horizontal direction.

Another object is the provision of a particular form of coupling between the rolling and crushing members to permit such movement.

Another object is the provision in a device of this character of a roller member composed of separate pulverizing and crushing rings of particular form each of which is provided with a plurality of projecting lugs or extensions in the form of sleeves through which the securing rods are adapted to pass.

To the accomplishment of the foregoing and such other objects as may hereinafter appear, my invention consists in the combination, arrangement and construction of parts and details hereinafter described and then sought to be defined in the appended claims, reference being had to the accompanying drawings, forming a part hereof and in which is shown, merely for the purpose of an illustrative disclosure, a preferred embodiment of my invention, it being understood that various changes may be made in the construction and arrangement of parts and details of the device within the scope of the claims without digressing from my inventive idea which is defined therein.

In the drawings, Figure 1 is a plan view of a device constructed according to my invention, the two crushing and pulverizing rollers being shown in alinement. Fig. 2 is an end view of the device shown in Fig. 1. Figs. 3, 4 and 5 are detailed views of one of the connecting members of the coupling. Fig. 6 is a side elevation of one of the crushing and pulverizing rings. Fig. 7 is an edge view of two of the rings assembled. Fig. 8 is a similar view showing the use of additional spacing sleeves. Fig. 9 is a diagrammatic plan view of the device showing the two rolling members thereof in alinement. Fig. 10 is a view of the same character showing the members disposed at an angle to each other. Figs. 11, 12 and 13 are front diagrammatic views showing the two rolling members disposed in alinement in a vertical plane with each other and then at various angles to each other respectively.

In the drawings the numeral 1 designates the tongue of the device to which is secured the frame 2, diagonal braces 3 being utilized. The frame 2 comprises the long transversely extending member 4 and the arms 5 which extend rearward at right angles to said member 4, being provided at their rear ends with the straps or loops 6 which form bearings for the outer end of the shafts 7, the inner ends of said shafts being connected by the coupling 8, to be described later. Mounted on top of the coupling 8 is a seat support 9, which is secured thereon by the bolts as shown, one of these same bolts 10 holding the adjusting link 11 which extends forward and is provided with the apertures 12 in which is secured bolt 13 which passes through an opening in the bracket 14 which is secured to the underside of the frame 2 and the tongue 1. As the center coupling 8 is a pivoting coupling, it is obvious that by adjusting the link 11 relative to the bracket 14 the angle between the shafts 7 may be changed as desired.

On the shafts 7 are loosely mounted the rolling, crushing and pulverizing members, each of which comprises a plurality of rings 15. Similar rings 16 are used as the outer end rings and as the next to inner end rings. These rings 16 are each provided with the spokes 17 radiating from the hub 18 which thus provides a supporting means for the members as a whole. Each of the rings 15 and 16 are provided with projecting lugs or extensions 19 arranged in pairs on each side thereof which are bored to receive the bolts 21 to hold each rolling member in an assembled condition, the projections 19 serving as spacing members. If these projections 19 do not provide sufficient space, additional spacing sleeves 22 may be utilized between the rings as shown in Fig. 8.

The ground engaging edge of each ring is of a peculiar conformation, in that it has a plurality of cut out portions 23 alternating with the ground engaging projections 24, the latter having beveled sides so that they are of a truncated pyramidal shape. This form of a ground engaging ring provides an effective means of crushing and pulverizing the earth and soil.

As stated before, the inner ends of the shafts 7 are connected by the pivoting coupling 8. This coupling comprises two members 25 and 26, the one being secured to the inner end of one shaft, and the other to the inner end of the other shaft. As these members are substantial duplicates of each other, it will be necessary to describe only one of them. Each member is in the form of a slightly flared sleeve 27 provided with a flared or tapered opening 28 which is adapted to receive the inner end of one of the shafts 7 which is held therein by means of a pin 29 passing through openings 30. Extending diagonally from the edge of the inner end of each member is a lug or projection 31, which is provided with a flattened circular portion 32, part of the bearing surface of which is curved or sloped as indicated at 33. This circular portion is provided with the outwardly tapered or flared bore 34. When the two members of the coupling are assembled, it is understood that the bearing surfaces of the circular portions 32 of the lugs are in contact, with a bolt 35 passing through the tapered apertures therein. The tapered bores in the lugs 31 as well as the curved or sloped bearing surfaces thereof permit an oscillatory movement of the members of the coupling relative to each other vertically whereby the two rolling and crushing members may yield according to the various inequalities of the surfaces over which the device is moved. The bolt 35 being a pivotal connection, allows the angle between the two rolling members to be adjusted as desired.

It is seen then from this description, taken in connection with the drawings, that I have provided a roller composed of two members which may be adjusted horizontally at various angles to each other, and which may yield vertically with respect to each other according to the character of the surface on which the device is working. I have also provided a simple and effective form of coupling between these two members to permit this movement, and further have devised a very effective form of crushing and pulverizing device due to the particular character of the ground engaging edge of the rings which form the rolling members. In addition, I have provided an effective way of assembling and spacing the various rings which form each rolling and crushing member.

In order to regulate the action of my invention I provide a receptacle 36 on each shaft. These receptacles are adapted to contain a suitable amount of sand whereby the weight of the device may be adjusted according to working conditions.

The device as a whole provides a simple and effective means for crushing the clods and so pulverizing the soil that a mulsh is left on top of the ground. However the subsoil and the top soil will both pack to a certain extent due to the action of the device.

My invention is very simple in its makeup, may be easily repaired and is effective in operation.

What I claim is:—

1. In a device of the character described, a frame, a plurality of shafts connected to said frame, roller and crusher members mounted on each of said shafts, a coupling for the inner ends of said shafts, said coupling comprising a member for each shaft, each member having a lug extending therefrom, each lug being provided with a partially curved or sloped surface, the members being so positioned on the inner ends of the shafts that the partially curved or sloped surfaces are in contact and means passing through said lugs for pivotally connecting said members.

2. In a device of the character described, a frame, a plurality of shafts connected to said frame, roller and crusher members mounted on each of said shafts, a coupling for the inner ends of said shafts, said coupling comprising a member for each shaft, each member having a lug extending therefrom, each lug being provided with a partially curved or sloped surface and also having a flared or tapered opening therethrough, the members being so positioned on the inner ends of said shafts, that the partially curved or sloped surfaces contact with each other, and securing means passing through said flared or tapered openings.

3. In a device of the character described, a frame, a plurality of shafts connected to said frame, roller and crusher members mounted on each of said shafts, a coupling for the inner ends of said shafts, said coupling comprising a member for each shaft, each member having a lug extending therefrom, each lug having a flattened circular portion having part of its surface curved or sloped, the members being so positioned on the inner ends of said shafts that the partially curved or sloped surfaces contact with each other, and means passing through said lugs for pivotally connecting said members.

4. In a device of the character described, a frame, a plurality of shafts connected to said frame, roller and crusher members mounted on each of said shafts, a coupling for the inner ends of said shafts, said coupling comprising a member for each shaft, each member having a lug extending diagonally from one end thereof, each lug having a flattened circular portion having part of its surface curved or sloped, each lug also having an outwardly tapered or flared opening therethrough, the members being so positioned on the inner ends of said shafts that the partially curved or sloped surfaces contact with each other, and a bolt passing through said flared or tapered openings.

5. In a device of the character described, a frame, a plurality of shafts connected to said frame, roller and crusher members mounted on each of said shafts, a coupling for the inner ends of said shafts, said coupling comprising a member for each shaft, each member having a lug extending therefrom, each lug being provided with a partially curved or sloped surface, the members being so positioned on the inner ends of the shafts that the partially curved or sloped surfaces are in contact and means passing through said lugs for pivotally connecting said members, so as to permit angular movement of the shafts relative to each other in both a horizontal and vertical direction, a link connecting said coupling to said frame, and means for adjusting the link so as to vary the angular relation of the shafts relative to each other.

6. In a device of the character described, a crushing and pulverizing member, said member being annular in form and having its outer edge formed with cut out portions and frusto-pyramidal projections, said member having bored lugs or projections formed integrally therewith extending laterally therefrom.

7. In a device of the character described, a crushing and pulverizing member, said member being annular in form and having its outer edge formed with cut out portions and frusto-pyramidal projections, said member having bored lugs or projections disposed in pairs on opposite sides thereof and extending laterally therefrom.

In testimony whereof I affix my signature, in presence of two witnesses.

NORMAN T. NICHOLS.

Witnesses:
   HENRY P. JONES,
   WILL T. KUNKLE.

Copies of this patent may be obtained for five cents each, by addressing the "Commissioner of Patents, Washington, D. C."